United States Patent
Hughes (10) Patent No.: US 8,303,122 B2
(45) Date of Patent: *Nov. 6, 2012

(54) GLAZING PANEL

(75) Inventor: Brian John Howard Hughes, Caerleon South Wales (GB)

(73) Assignee: Solipco Limited, Caerleon, Newport, Gwent (GB)

( * ) Notice: Subject to any disclaimer, the term of this patent is extended or adjusted under 35 U.S.C. 154(b) by 438 days.

This patent is subject to a terminal disclaimer.

(21) Appl. No.: 12/526,229

(22) PCT Filed: Feb. 7, 2008

(86) PCT No.: PCT/GB2008/050078
§ 371 (c)(1),
(2), (4) Date: Aug. 6, 2009

(87) PCT Pub. No.: WO2008/096176
PCT Pub. Date: Aug. 14, 2008

(65) Prior Publication Data
US 2010/0007962 A1   Jan. 14, 2010

(30) Foreign Application Priority Data
Feb. 7, 2007 (GB) .................................. 0702353.4

(51) Int. Cl.
*G02B 27/00* (2006.01)
(52) U.S. Cl. ................... 359/613; 359/601; 359/614
(58) Field of Classification Search .......... 359/601–614, 359/831, 591–597
See application file for complete search history.

(56) References Cited

U.S. PATENT DOCUMENTS

| 721,259 A * | 2/1903 | Wadsworth ................... 359/595 |
| 1,768,354 A * | 6/1930 | Falge ............................. 359/608 |
| 3,085,474 A * | 4/1963 | Bourgeaux et al. ........... 359/598 |
| 3,257,486 A | 6/1966 | Luboshez |
| 3,603,670 A | 9/1971 | Kim |
| 4,498,455 A | 2/1985 | Gramm |
| 4,673,609 A | 6/1987 | Hill |
| 4,756,603 A * | 7/1988 | Ohtani ........................ 359/601 |
| 5,461,496 A * | 10/1995 | Kanada et al. ................ 359/592 |
| 5,830,529 A | 11/1998 | Ross |
| 6,467,935 B1 | 10/2002 | Schwab |
| 2005/0068630 A1 | 3/2005 | Nitz et al. |

FOREIGN PATENT DOCUMENTS

| EP | 1316416 A1 | 6/2003 |
| TW | 552344 B | 9/2003 |

* cited by examiner

*Primary Examiner* — Thong Nguyen
(74) *Attorney, Agent, or Firm* — Edwin D. Schindler (57) ABSTRACT

A glazing panel includes a sheet of glass and a series of spatially separated optical elements disposed on a major face of glass. Each element has an upwardly-facing reflective surface, which extends out of the plane of the glass. A region of the material, having an optical transmission coefficient, which varies across its width, is disposed below the surface. Light incident on the upwardly facing reflective side surfaces is reflected upwardly into the area on the other side of the glazing panel. Light entering the area through the region is attenuated and diffused. The elements may be printed onto the glass, or onto a film, that is applied to the glass. Alternatively, the elements may include profiled formations which are adhered to the glass.

19 Claims, 5 Drawing Sheets

GLAZING PANEL

BACKGROUND OF THE INVENTION

1. Technical Field of the Invention

This invention relates to a glazing panel for the control of unwanted solar glare and heat caused by sunlight travelling through the panel.

2. Description of the Prior Art

It is well known to mount horizontal slats in the form of Venetian blinds across the rear of glazing panels on buildings in order to attenuate and redirect the sunlight. Such blinds are only a temporary solution to the problem and their effect is dependant on them being lowered and correctly adjusted.

It is also well known to mount permanent horizontal slats across the front of glazing panels on some buildings in order to attenuate and redirect the sunlight. Such so-called brise soleil or solar veils are expensive in construction, unsightly and heavy as well as being difficult to clean and maintain. Once such brise soleil is disclosed in Taiwanese Patent Application TW552344B.

I have now devised a glazing panel which alleviates the above mentioned problems.

SUMMARY OF THE INVENTION

In accordance with this invention, there is provided a glazing panel comprising a substrate sheet and a series of spatially separated optical elements disposed on a major face of the substrate, each element having an optical transmission coefficient which varies across its width, parallel to the plane of the substrate, from a first side to a second side thereof, the first side being less optically transmissive than said second side, wherein the thickness of each element, perpendicular to the plane of the substrate, is greater at said first side thereof than said second side thereof, said first side of each element comprising a reflective side face directed generally parallel to the plane of the substrate and facing in substantially the same direction as adjacent elements of the series.

In use, the glazing panel is installed such that the reflective side faces of the elements face generally upwardly. As sunlight shines downwardly from the sky above onto one side of the glazing panel, the light incident on the upwardly facing reflective side surfaces will be reflected upwardly towards the ceiling of the room or area on the other side of the glazing panel. In this manner, the amount of direct light incident on people in the room is substantially reduced, yet the redirected light still maintains a sufficient degree of natural light in the room or other area.

Preferably the optical transmissivity of at least a portion of each element increases gradually from said first side to said second side of the element.

The total area of the reflective side faces can be significant (e.g. 3 times greater) compared with the area of the glazing panel and thus it will be appreciated that a large proportion of the direct sunlight is reflected upwardly and redirected based upon the angle of orientation of the reflective side face.

Any light incident on the front face of the elements will be transmitted through the elements in accordance with the optical transmission coefficient thereof. Some of the incident light is reflected, absorbed and/or diffused as it passes through the element, thereby controlling the intensity and/or color of the light passing directly through the glazing panel.

A glazing panel in accordance with the present invention is simple, inexpensive and light in construction, yet is able to reliably control the amount of light entering a room or other area.

The elements are spatially separated and thus some of the sunlight is able to pass directly through the substrate of the glazing panel in the normal way. It will be appreciated that the separation of the elements, the area of the elements as well as the area of the reflective faces can all be selected to control the characteristics of the light entering the room or other area. Preferably the elements are spaced by a distance which is substantially equal to the height of the reflective face of the adjacent element from the surface of the substrate.

The spatial separation of the elements may vary along the length or width of the substrate, for example such that there are fewer elements at the bottom of the glazing panel in order to improve visibility, and more at the top in order to shield the persons in the room from direct sunlight from above.

In a preferred embodiment, the elements comprise lines which extend fully or partially across the width of the substrate and which, in use, lie generally horizontally and parallel to each other.

In an alternative embodiment, the elements may comprise an array of spatially separated dots, pixels or other individual elements which extend across the width and length of the substrate.

The reflective faces of the elements may all face in the same direction. Alternatively, the direction may vary across the width and/or length of the substrate in order to control the characteristics of the light entering the room to take account of the changes in the direction and intensity of light during the day or of external shading.

Preferably the substrate comprises glass. The elements may be applied directly to the substrate or to a film which is applied to the substrate. In the former case, the surface of the substrate onto which the elements are applied is preferably treated, for example by plasma treating. In the latter case, the film may comprise a spectrally selective film which controls the amount of visible light and/or the amount of solar energy passing through the panel. Alternatively, the substrate may be coated with a spectrally selective layer. The filter characteristics of the film may vary across its width and/or length.

The substrate may be mounted in parallel with another substrate which may be interconnected around their peripheries to form a glazing unit. Preferably, the elements are applied to a side of one substrate which faces the side of the other substrate, such that they are disposed between the two substrates.

The substrate may be laminated to another substrate with said elements being disposed between the substrates. The elements may be applied directly to the surface of one of the substrates or to a film which is disposed between the substrates. In the former case, the substrates are preferably bonded to each other, the surface of the substrate on which the elements preferably being treated (eg by plasma treating) to improve the adhesion of the elements therewith and to avoid de-lamination of the substrates. In the latter case, the film is preferably apertured to allow direct adhesion of the substrates through the apertures.

The elements may be positioned behind a protective layer, such as a layer of lacquer.

In one embodiment, the elements may be formed by depositing or depositing an ink or other formable material onto the substrate or onto the film which is applied to the substrate.

Preferably the elements are formed by deporting a uniform color onto the substrate or film, the transmission coefficient of the elements being varied by varying the amount of ink or other formable material that is deposited.

Preferably the ink or other formable material is applied by depositing pixels of the same intensity of ink onto the substrate or film, the transmission coefficient being varied by varying the spacing of the pixels and/or their degree of overlap.

Preferably the reflective side face of each element is formed by depositing more ink or more pixels of ink at said first side of the element than at said second side, thereby increasing the thickness of the first side relative to the second side. Preferably the reflective side face of each element is formed by depositing white material which reflects a broad spectrum of the incident light.

Commercially available printing apparatus generally comprise a leading print head of white followed by three print heads of cyan, magenta, yellow and black. These so-called CMYK heads are then followed by another print head of white. Each head is only able to pass over the same at limited number of times, such that the thickness of the reflective side face is limited by the number of times that white can be deposited in one place. Thus, the reflective side face of each element is preferably formed by depositing ink of a plurality of colors at said first side of the element onto white ink, the colored ink then being overprinted by white ink, preferably in a manner such that the white ink encapsulates the colored ink.

The optical transmission coefficient of each element may vary abruptly, gradually or linearly between said first and second sides of the element.

The thickness of each element may vary abruptly, gradually or linearly between said first and second sides of the element.

The elements may be triangular or stepped in section.

Preferably the elements are substantially white in color so that the side faces of each element reflect visible light across a broad spectrum of wavelengths.

The side face of the elements may be metallized or comprise another material, which absorbs very little of the incident light being reflected.

The front or/rear surfaces of the element may be formed of a different color or colors to at least said side surface, in order to present a colored or patterned appearance to persons outside and/or inside the building.

In an alternative embodiment, each element comprises a pre-formed 3-dimensional formation which is adhered to the substrate.

The 3-dimensional formation may comprise a sheet material which is deformed out of its plane at said first side thereof. Preferably, the sheet is printed or otherwise provided with means forming the, or each, element, said means comprising a first region having an optical transmission coefficient which varies across its width from a first side to a second side thereof, the first side being less optically transmissive than said second side, and a second region at first side which is reflective, said sheet being deformed such that said second region extends out of the plane of the sheet and provides said reflective face directed generally parallel to the plane of the substrate and facing in substantially the same direction as adjacent elements of the series.

Preferably the sheet is printed or otherwise provided with parallel spatially-separated lines respectively forming each element, each line comprising a first longitudinal region having an optical transmission coefficient which varies across its width from a first side to a second side thereof, the first side being less optically transmissive than said second side, and a second longitudinal region at side first which is reflective, said sheet being deformed such that said second region extends out of the plane of the sheet and provides said reflective face directed generally parallel to the plane of the substrate and facing in substantially the same direction as adjacent elements of the series. Preferably the sheet is clear such that the lines are separated by clear lines which allow light to pass therethrough.

Also in accordance with the present invention, there is provided a method of forming a glazing panel as herein before defined, the method comprising the steps of surveying the external light incident at the location at which the glazing panel is to be provided and selectively varying the parameters for at least the spatial separation elements, the height for the reflective side faces of the elements and the distance for between the first and second sides of the elements in accordance with the survey, and applying said elements to said substrate accordingly.

The method may be performed on a substrate panel which is already in situ or on a substrate panel for mounting in situ.

The parameters may be varied over the area of the substrate to take account in changes in light during the day, externally shaded areas or areas in building the light through the panel needs to be controlled.

BRIEF DESCRIPTION OF THE DRAWING FIGURES

Embodiments of the present invention will now be described by way of examples only and with reference with accompanying drawings, in which.

DETAILED DESCRIPTION OF THE DRAWING FIGURES

Figure 1:
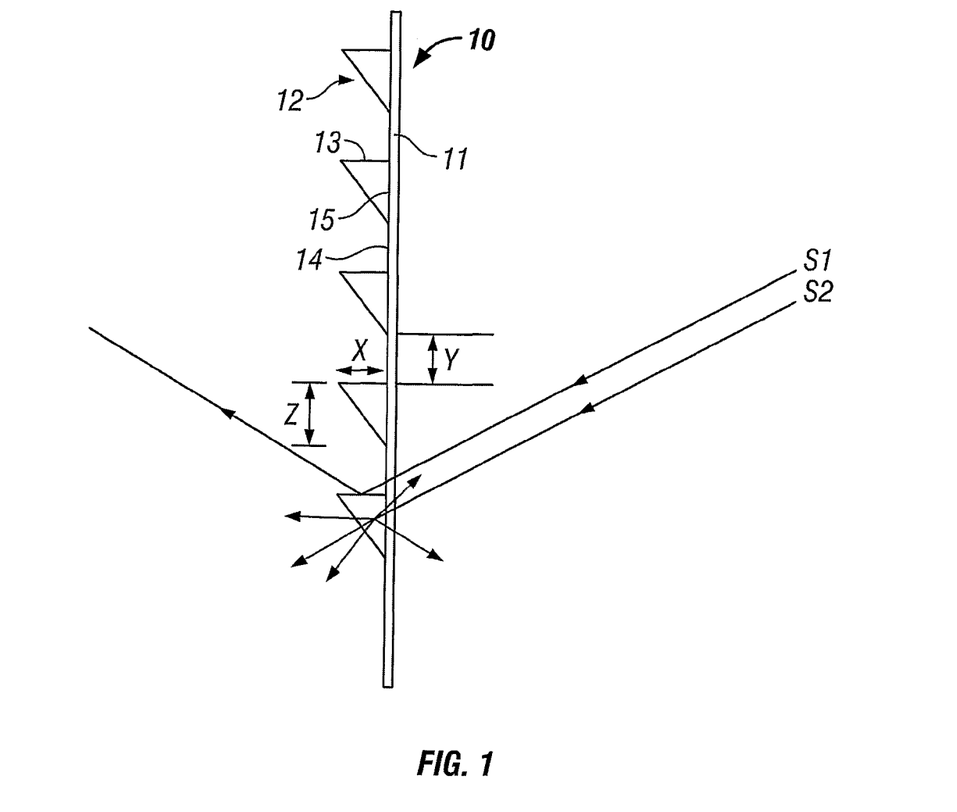
FIG. 1 is a sectional view through a first embodiment of glazing panel in accordance of this invention.
Figure 2:
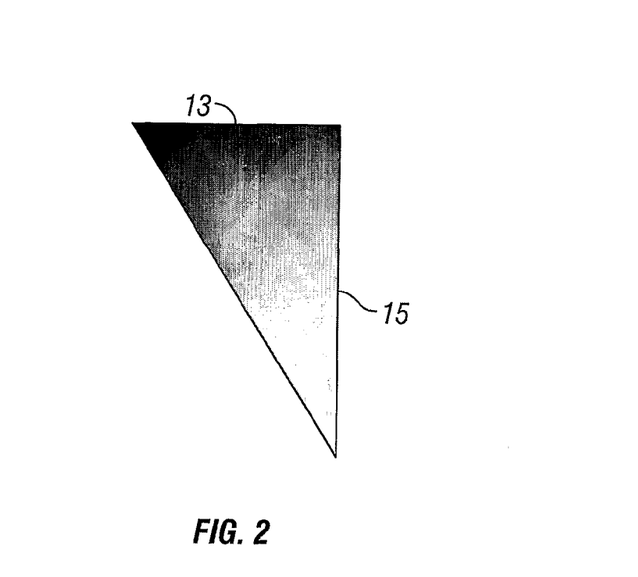
FIG. 2 is an enlarged sectional view through an optical element of the glazing panel of FIG. 1.

Referring to FIGS. 1 and 2 of the drawings, there is shown a first embodiment of glazing panel 10 in accordance with the present invention, the panel comprising a substrate panel 11 of glass or other transparent material, such as plastics. A plurality of elongate optical elements 12, in the form of horizontal parallel lines, extend between opposite side edges of the substrate 11.

The optical elements 12 are digitally printed directly onto the inner face of the substrate 11. Each element 12 is generally triangular in section and comprises a generally flat upper surface lying perpendicular to the plane of the substrate 11. The thickness of each element 12 gradually reduces towards the lower side edge thereof. Each element 12 is constructed by depositing a series of white or light colored pixels, with the thickness of elements 12 being varied by adjusting the spacing between the pixels and/or their degree of overlap: the thickest portion of each element 12 is formed by depositing a denser array of overlapping pixels, while the thinner region is formed by depositing pixels which are widely spaced apart. In the example shown, the ink density (i.e. the density of pixels) is varied linearly from 100% at the upper side edge to 10% at the lower side edge.

The upper face of each element 12 defines a so-called light shelf 13 having a height X off the surface of the substrate 11. Each light shelf 13 faces an adjacent unprinted clear region 14 of the substrate 11 having a width Y. The distance X and Y are variable parameters and are preferably equal.

The elements 12 comprise an inner face or so-called glare control panel 15 which are directed through the substrate 11 towards the exterior of the glazing panel 10. The height Z of each glare control panel 15 is also a variable parameter, which preferably varies inversely proportionally to Y.

In use, the sun's rays S1, S2 shine down from the sky onto the glazing panel 10 and some of the incident rays e.g. S1 hit the so-called light shelves 13 formed by the upper side faces of elements 12 and are reflected upwardly into the room and redirected at an equal and opposite angle instead of passing downwardly through the glazing panel onto people or work surfaces within the building. Preferably none of the reflected light is attenuated and thus the level of reflected light entering the room is the same as that which would have passed straight through the panel.

Other incident rays e.g. S2 hit the so-called glare control panel 15, which reflects, attenuates and diffuses the light according to the characteristics of the panel thereby allowing a softer and more diffuse light to shine directly into the room. The color of the transmitted light can be varied by adjusting the color of the ink used for the glare control panel 15. The amount of direct light can be varied by adjusting the width Z of the glare control panel 15. The amount of reflected light can be adjusted by varying the height X of the light shelf 13.

Figure 3:
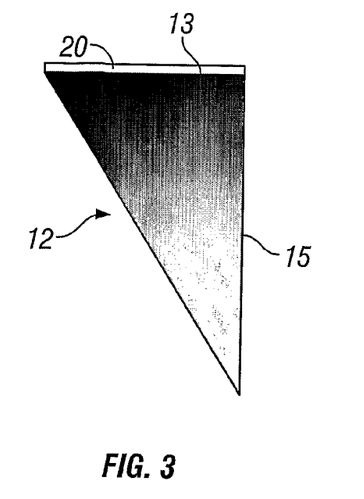
FIG. 3 is an enlarged sectional view of an optical element of a second embodiment of glazing panel in accordance with the present invention.

Referring to FIG. 3 of the drawings, in a second embodiment the light shelf 13 is coated with a metalized or reflective layer 20. Alternatively, the layer 20 may be formed by depositing the elements 12 with a more reflective color at their upper edge.

Figure 4:
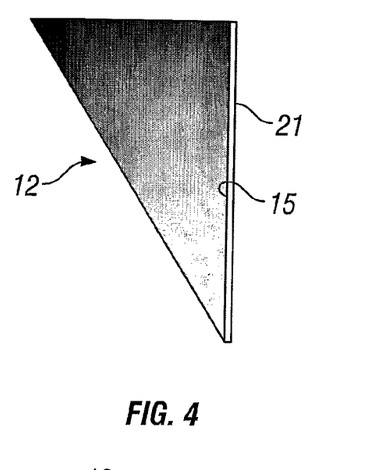
FIG. 4 is an enlarged sectional view through an optical element of a third embodiment of glazing panel in accordance with present invention.

Referring to FIG. 4 of the drawings, in a third embodiment the outer face of the glare control panel 15 is printed with a layer 21 of a different color to present a colored appearance to the exterior of the glazing panel. The layer 21 of each element 12 could alternatively carry a different portion of an image. In an alternative embodiment, the layer may be provided on the inner face of the elements 12, in order to present a colored appearance to the interior of the glazing control panel.

Figure 5:
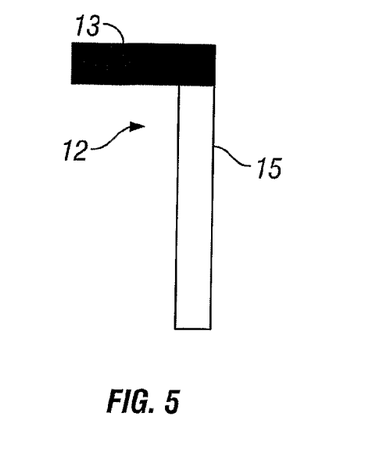
FIG. 5 is an enlarged sectional view through an optical element of a fourth embodiment of glazing panel in accordance with the present invention.

Referring to FIG. 5 of the drawings, in a fourth embodiment the upper edge of the elements 12 are printed with a high density of ink to provide the light shelf 13, the density of the ink then changing abruptly to provide a glazing control panel 15 having a uniform optical transmission co-efficient as shown. In an alternative embodiment, the glazing control panel 15 may have a variable optical transmission co-efficient.

Figure 6:
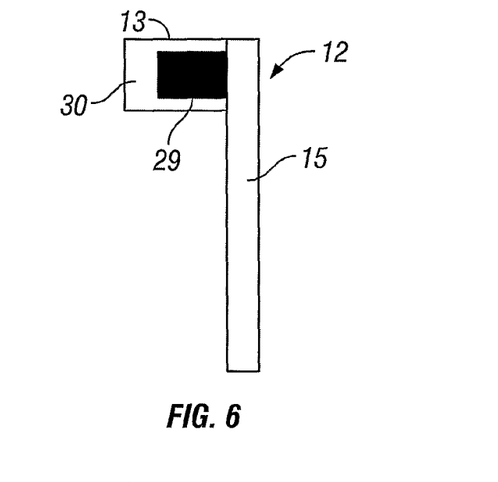
FIG. 6 is an enlarged sectional view through an optical element of a fifth embodiment of glazing panel in accordance with the present invention.
Figure 7:
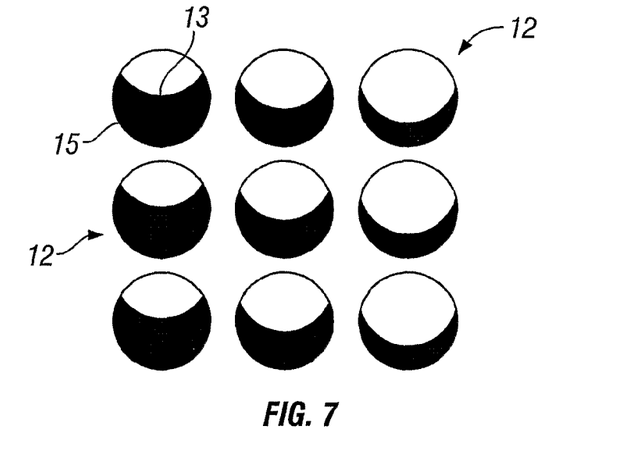
FIG. 7 is a front view of a sixth embodiment of glazing panel in accordance with the present invention.

Referring to FIG. 6 of the drawings, in a fifth embodiment the glazing control panel 15 is printed in white with the ink density varying from 100% at the upper side edge to 10% at the lower side edge. The upper edge of the elements 12 are then over-printed with a plurality of colored inks eg cyan, magenta, yellow and black (CMYK) to form an upstanding block 29 of solid ink. The block 29 is then over-printed with white ink 30, which encapsulates the sides of the block 29 to provide the light shelf 13.

Referring to FIG. 6 of the drawings, in a sixth embodiment, the elements 12 are printed as an array, each element being crescent-shaped and having a concave upper surface defining the light shelf 13. The direction in which the light shelves 13 face may be varied across the width of the glazing panel to take account of changes in light during the day.

Figure 8:
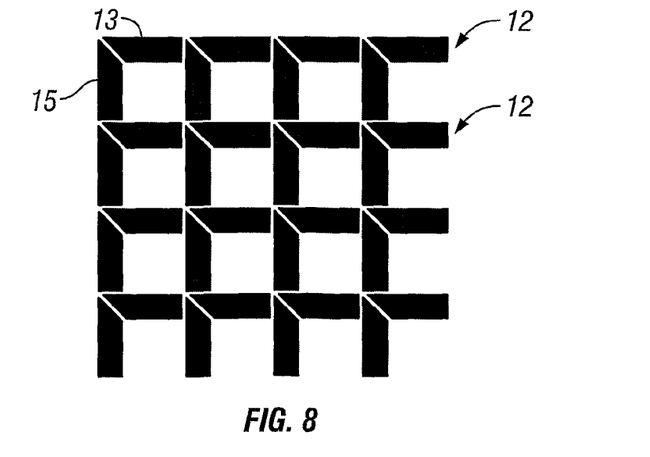
FIG. 8 is a front view of a seventh embodiment of glazing panel in accordance with the present invention.

Referring to FIG. 8 of the drawings, it will be appreciated that the elements 12 could be of any shape, provided that an upwardly-facing light shelf 13 is provided below a clear area with a glazing control panel 15 extending below the light shelf 13.

Figure 9:
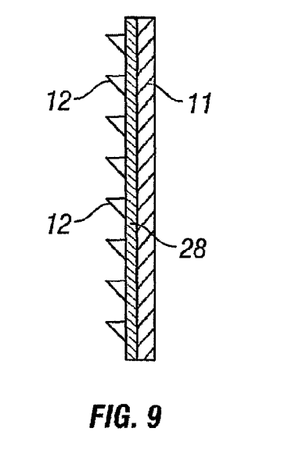
FIG. 9 is a sectional view of an eighth embodiment of glazing panel in accordance with the present invention.

Referring to FIG. 9 of the drawings, there is shown an eighth embodiment of glazing panel 10 in accordance with the present invention, which is similar to the glazing panel of FIGS. 1 and 2 and like parts are given like reference numerals. In this embodiment, the optical elements 12 are digitally printed onto a film 28 which is applied to the inner face of the substrate 11.

Figure 10:
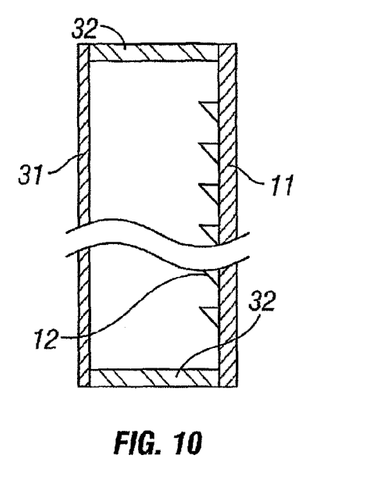
FIG. 10 is a sectional view of a ninth embodiment of glazing panel in accordance with the present invention.

Referring to FIG. 10 of the drawings, there is shown a ninth embodiment of glazing panel 10 in accordance with the present invention, which is similar to the glazing panel of FIGS. 1 and 2 and like parts are given like reference numerals. In this embodiment, the elements 12 are digitally printed either onto a film (not shown) which is applied to the inner face of the substrate 11, or directly onto the inner face of the substrate 11. The substrate 11 is mounted in parallel with another substrate 31, the substrates 11,31 being interconnected around their peripheries by side members 32 to form a glazing unit. The elements 12 are arranged on the inner surface of the substrate 11, such that they are disposed between the two substrates.

Figure 11:
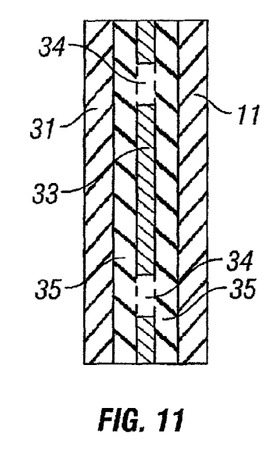
FIG. 11 is a sectional view of a tenth embodiment of glazing panel in accordance with the present invention.

Referring to FIG. 11 of the drawings, there is shown a tenth embodiment of glazing panel in accordance with the present invention. In this embodiment, the optical elements 12 are provided on a film 33 disposed between two substrates 11,31 which are laminated together by a bonding material 35. A plurality of apertures 34 are formed in the film 33 to allow the bonding material 35 to directly interconnect the substrates 11,31 and so as to avoid de-lamination of thereof.

Figure 12:
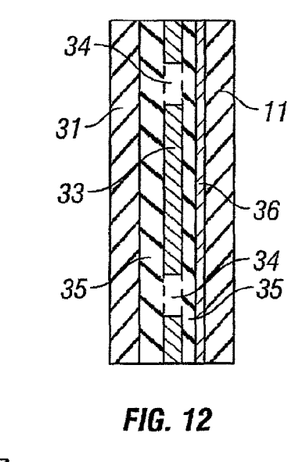
FIG. 12 is a sectional view of an eleventh embodiment of glazing panel in accordance with the present invention.

Referring to FIG. 12 of the drawings, there is shown an eleventh embodiment of glazing panel in accordance with the present invention, which is similar to the glazing panel of FIG. 11 and like parts are given like reference numerals. In this embodiment the inner surface of one of the substrates eg 11 is provided with a spectrally selective layer 36 which controls the amount of visible light and/or the amount of solar energy passing through the panel.

Figure 13:
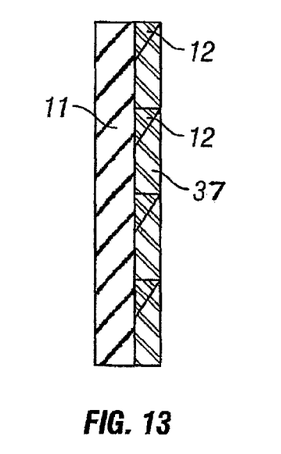
FIG. 13 is a sectional view of an twelfth embodiment of glazing panel in accordance with the present invention.

Referring to FIG. 13 of the drawings, there is shown a twelfth embodiment of glazing panel 10 in accordance with the present invention, which is similar to the glazing panel of FIGS. 1 and 2 and like parts are given like reference numerals. In this embodiment, the elements 12 are covered with a protective layer 37 of lacquer.

Figure 14:
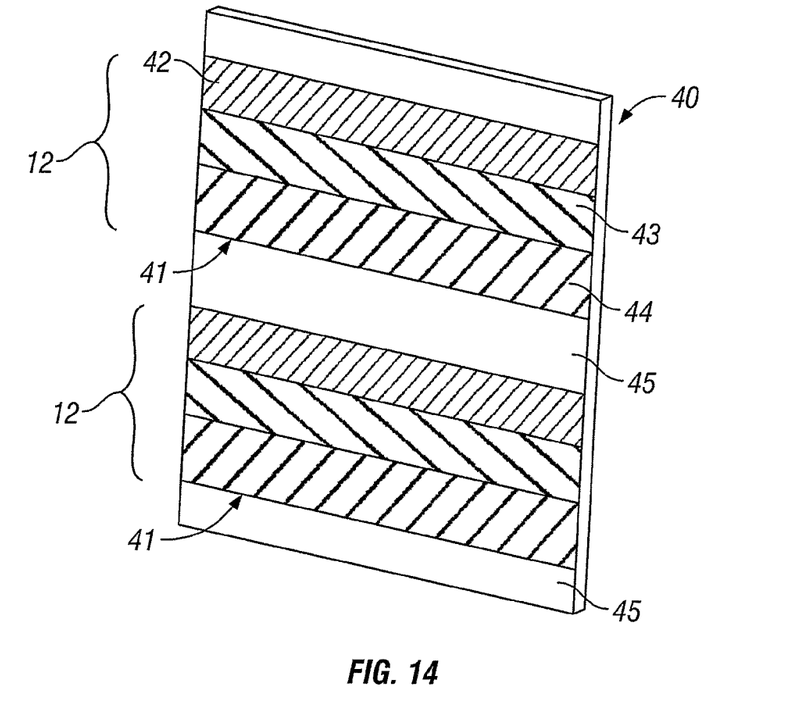
FIG. 14 is a perspective view of a sheet for forming a thirteenth embodiment of glazing panel in accordance with the present invention, the sheet being unformed.

Referring to FIG. 14 of the drawings, there is shown a sheet 40 for applying to a substrate (not shown) to form a thirteenth embodiment of glazing panel in accordance with the present invention. The sheet 40 comprises a plurality of parallel strips or bands 41 disposed on a clear plastic film. Each strip or band 41 comprises an upper longitudinally-extending line 42 of a reflective material or of a color such as white which reflects a broad spectrum of light, a central longitudinally-extending line 43 and a lower longitudinally-extending line 44 of a material having an optical transmissivity which increases gradually from its upper edge to its lower edge. Each strip or band 41 is separated from an adjacent strip or band 41 by a region 45 which is left clear.

Figure 15:
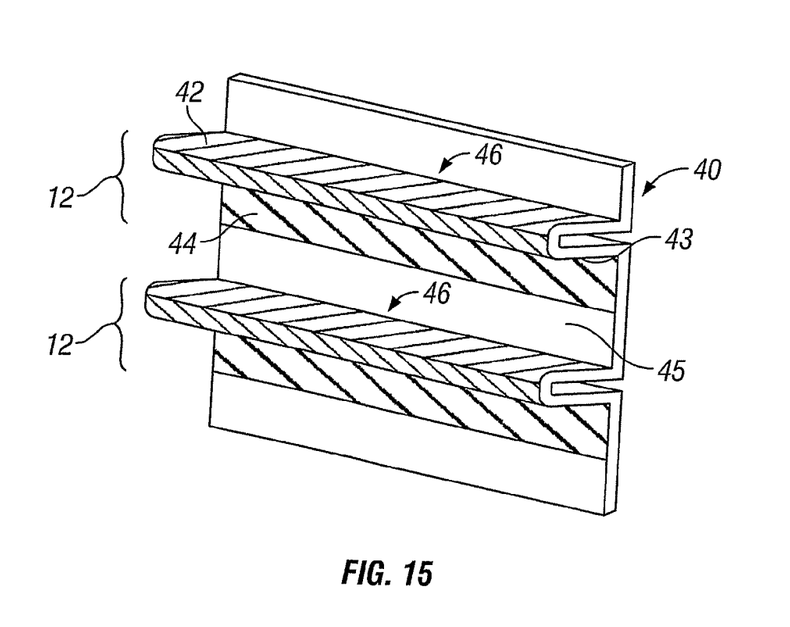
FIG. 15 is a perspective view of the sheet of FIG. 15 following formation.

Referring to FIG. 15 of the drawings, the sheet 40 is folded along each strip or band 41 to provide a projection 46 having an upper face which carries said upper longitudinally-extending line 42 eg of reflective material and defines the so-called light shelf. The line 44 of variable transmissivity material extends below the projection 46 and provides the so-called glare control panel. The sheet 40 may be folded by deforming it between a pair of mould halves. Once formed, the sheet 40 can be adhered to a sheet of glass. In an alternative embodiment, each element is provided as an individual profiled member for adhering to a sheet of glass.

The present invention thus provides a system of designed and printed patterns of varying size and printed intensity that can be digitally placed in desired positions on the printed surface to manage and control the amount of light travelling through or acting upon a glazed or external sun facing panel. The optical height of the elements off the substrate panel and the density of the elements can be varied to suit particular applications.

The invention claimed is:

1. A glazing panel, comprising:
a substrate sheet and a series of spatially separated optical elements disposed on a face of said substrate, each element of said optical elements having an optical transmission coefficient varying varies across its width, parallel to a plane of said substrate, from a first side to a second side thereof, said first side being less optically transmissive than said second side, wherein a thickness of each said element, perpendicular to the plane of said substrate, is greater at said first side thereof than said second side thereof, said first side of each said element comprising a reflective side face directed substantially parallel to the plane of said substrate and facing in substantially the same direction as adjacent said elements of said series of said optical elements.

2. The glazing panel according to claim 1, wherein at least a portion of each said element has an optical transmissivity increasing gradually from said first side to said second side of said element.

3. The glazing panel according to claim 1, wherein said elements are spaced by a distance that is substantially equal to a height of the reflective face of an adjacent said element from the surface of said substrate.

4. The glazing panel according to claim 1, wherein the spatial separation of said elements varies along a length or width of said substrate.

5. The glazing panel according to claim 1, wherein said substrate includes a spectrally selective material controlling an amount of visible light, or an amount of solar energy, passing through said glazing panel.

6. The glazing panel according to claim 1, wherein the surface of said substrate onto which said elements are applied is plasma-treated.

7. The glazing panel according to claim 1, further comprising an additional substrate mounted in parallel with said substrate.

8. The glazing panel according to claim 7, wherein said elements are applied to a side of said additional substrate that faces the side of said substrate, so that said elements are disposed between said substrate and said additional substrate.

9. The glazing panel according to claim 7, wherein said elements are applied to a film disposed between said substrate and said additional substrate.

10. The glazing panel according to claim 1, wherein said elements are formed by depositing an ink material onto said substrate.

11. The glazing panel according to claim 10, wherein said elements have a transmission coefficient that is varied by varying an amount of said ink material that is printed.

12. The glazing panel according to claim 10, wherein said reflective side face of each said element is formed by depositing white ink.

13. The glazing panel according to claim 1, wherein the optical transmission coefficient of each said element varies abruptly, gradually or linearly between said first side and said second side of each said element.

14. The glazing panel according to claim 1, wherein the thickness of each said element varies abruptly, gradually or linearly between said first side and said second side of each said element.

15. The glazing panel according to claim 1, wherein each said element comprises a pre-formed three-dimensional formation adhered to said substrate.

16. The glazing panel according to claim 15, wherein said three-dimensional formation comprises a sheet material deformed out of its plane.

17. The glazing panel according to claim 16, wherein said sheet material is printed with means forming each said element, said means comprising a first region having an optical transmission coefficient varying across its width, from said first side to said second side thereof, said first side being less optically transmissive than said second side, and a second region at a first side which is reflective, said sheet material being deformed, so that said second region extends out of the plane of said sheet material and provides said reflective face directed substantially parallel to the plane of said substrate and facing in substantially the same direction as adjacent said elements of the series.

18. The glazing panel according to claim 16 wherein said sheet material is printed with parallel spatially-separated lines respectively forming each said element, each line comprising a first longitudinal region having an optical transmission coefficient varying across its width, from said first side to said second side thereof, said first side being less optically transmissive than said second side, and a second longitudinal region at a first side which is reflective, said sheet material being deformed, so that said second region extends out of the plane of the sheet and provides said reflective face directed substantially parallel to the plane of said sub-strate and facing in substantially the same direction as adjacent said elements of the series.

19. A method for forming a glazing panel, said glazing panel including:
a substrate sheet and a series of spatially separated optical elements disposed on a face of said substrate, each element of said optical elements having an optical transmission coefficient varying varies across its width, parallel to a plane of said substrate, from a first side to a second side thereof, said first side being less optically transmissive than said second side, wherein a thickness of each said element, perpendicular to the plane of said substrate, is greater at said first side thereof than said second side thereof, said first side of each said element comprising a reflective side face directed substantially parallel to the plane of said substrate and facing in substantially the same direction as adjacent said elements of said series of said optical elements, said method comprising the steps of:
surveying an external light incident at a location at which said glazing panel is to be provided; and,
selectively varying at least one parameter for:
(a) spatial separation elements;
(b) height of the reflective side faces of said elements; and,
(c) distance between the first side and the second side of said elements in accordance with said surveying step; and,
applying said elements to said substrate.

* * * * *